March 18, 1930.  C. WARLUZEL  1,751,375
APPARATUS FOR MEASURING PRESSURES
Filed Jan. 10, 1927
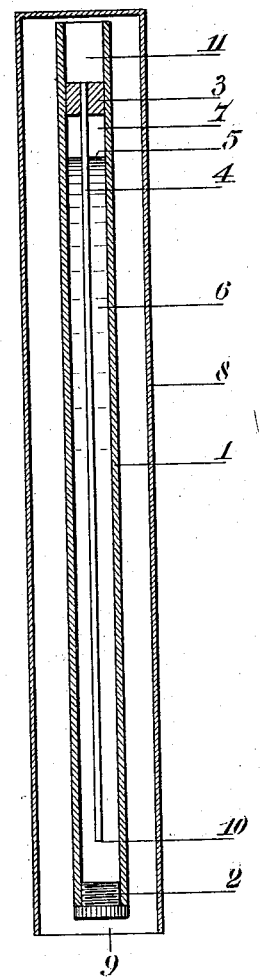
INVENTOR
Charles Warluzel
by Langner, Parry, Card & Langner
Attys.

Patented Mar. 18, 1930

1,751,375

UNITED STATES PATENT OFFICE

CHARLES WARLUZEL, OF PARIS, FRANCE

APPARATUS FOR MEASURING PRESSURES

Application filed January 10, 1927, Serial No. 160,248, and in France January 12, 1926.

The sounding devices employed hitherto are based in the contraction of an initial volume of air in a measuring tube under the thrust of the water entering by a narrow orifice into the tube.

The precision of such devices is inversely proportional to the square of the depths of sounding, since the contraction in volume of the air decreases for the same variation in pressure in proportion as the pressure augments, in accordance with the law of Mariotte.

The present invention has for its object a method which permits large and small pressures to be measured with equal precision and an apparatus designed for the application of this method to marine sounding.

The method consists in enclosing gas under constant volume, and then expanding this gas to a pressure chosen as a unit, the ratio of the two volumes giving the pressure by application of the law $pv = a$ constant.

In particular a sounding device according to the present invention comprises a holding tube closed at the top and open at the bottom in the manner of a diving bell, and in which holding tube is located a measuring device consistting of a tube preferably graduated, forming a manometer and containing water to an initial level predetermined so as to maintain in the upper part a constant volume of air.

This manometer is combined with means (siphon, capillary tube, valve, etc.) permitting the introduction or further quantities of air, into this capacity, under the influence of the increasing pressure.

The expansion of this enclosed air drives out part of the water contained in the manometric tube and gives the measured depth by direct reading.

By way of example a sounding device according to the present invention is illustrated in the annexed drawing.

It comprises a tube 1 closed at one end by a stopper 2 and at the other end by an obturator 3 which receives a capillary tube 4. The latter is open to the interior of the tube 1 at both ends, and acts as a siphon. The tube 1 is partly filled up to 5, and there is thus a part 6 filled with liquid and a part 7 filled with air at atmospheric pressure. The whole is located in a tube 8 forming a diving bell secured to the lead of the sounding device.

The apparatus thus constructed operates in the manner of a siphon.

The water penetrates the tube 8 by the lower opening 9 and compresses the air in the chamber 11 proportionally to the depth reached.

The compressed air penetrates through the tube 4, flows out through the opening 10, and enters the air chamber 7 the volume of which remains constant, but the pressure of which rises, equilibrium thus being set up little by little between the pressure in the air chamber 7 and the pressure of the water.

When the sounding device is drawn up the air contained in the chamber 7 expands and drives out the water as in a siphon by the tube 4 until equilibrium with the external pressure is again established.

This results in the air contained in the chamber 7 expanding by one volume for each increase of one atmosphere, in accordance with the law $pv =$ constant.

The successive volumes for the pressure increasing in arithmetic progression are therefore directly proportional to the pressure undergone, that is are also in arithmetic progression.

The tube 1 can be transparent and graduated, it can be non-transparent and in this case the volumes are measured by a gauge or by decantation of the water or any other means.

The constant volume 7 can be practically obtained in the following manner.

The tube 1 is held inverted, the stopper 2 unscrewed, the tube 1 filled with water up till the level of the end 10 of the interior tube 4 is reached, the excess of water flowing naturally out through this tube, the stopper is then screwed in and the tube inverted, the air thus enclosed rising to the upper part 7 of the tube 1.

Preferably a chamber 11 is provided at the upper end of the tube 1, which only contains air before the operation of sounding.

When the apparatus is drawn up to the surface the water contained in the tube 1, driven out by the expansion of the air contained in the chamber 7, more or less fills this chamber 11, and thus prevents the entry of further air in the case of successive immersion and withdrawal during the manipulation of the sounding device.

It is obvious that the present invention is not limited to the embodiment described above. For example another mode of formation of the bubble of air in the tube 1 could be imagined, and other forms of the elements of the sounding device could be adopted.

The present invention also permits the sensitiveness of the apparatus to be varied, either by the use of different initial volumes in the same tube, or by the use of several tubes differing in their initial volumes.

Having now particularly described and ascertained the nature of my said invention and in what manner the same is to be performed, I declare that what I claim is:

1. Apparatus for measuring the pressure of a liquid by confining a constant volume of gas, comprising a manometric receiver, adapted to hold a quantity of liquid up to a predetermined level, and a confined atmosphere of gas above said liquid level, a vessel forming a chamber containing a gas subject to the pressure of the liquid to be measured and a tube of slight diameter relative to the manometric receiver, said tube establishing direct communication between the lower part of the manometric receiver and a gas subject to the pressure of the liquid to be measured.

2. Apparatus as claimed in claim 1 in which the manometric receiver has the form of a tube.

3. Apparatus as claimed in claim 1 in which a capillary tube establishes communication between the manometric receiver and the said vessel.

4. Apparatus as claimed in claim 1 in which the manometric receiver is divided into two parts by an obturator, the lower part functioning as the container of the predetermined quantity of liquid, and the upper part forming a chamber for the liquid displaced from the tube which puts the lower part of the manometric receiver into communication with the said vessel.

5. Apparatus as claimed in claim 1 in which the vessel is opened at its lower end thereby forming a diving bell.

Dated this 28th day of December, 1926.

CHARLES WARLUZEL.